United States Patent [19]

Waddington

[11] Patent Number: 4,808,013
[45] Date of Patent: Feb. 28, 1989

[54] BEARING ASSEMBLY

[75] Inventor: Clive Waddington, Stratford, Conn.

[73] Assignee: Avco Corporation, Providence, R.I.

[21] Appl. No.: 142,145

[22] Filed: Jan. 11, 1988

[51] Int. Cl.[4] .................... F16C 23/08; F16C 43/04; B21D 53/10

[52] U.S. Cl. .................... 384/495; 384/558; 384/563; 384/581; 384/583; 29/149.5 R

[58] Field of Search .................... 384/495, 517–519, 384/535, 537, 558, 559, 563, 581, 583–585, 612, 620; 29/149.5 R

[56] References Cited

U.S. PATENT DOCUMENTS

| | | | |
|---|---|---|---|
| 2,440,720 | 5/1948 | Lee . | |
| 2,659,637 | 11/1953 | Barr . | |
| 3,237,400 | 3/1966 | Kuhrt | 60/35.6 |
| 3,467,451 | 9/1969 | Marley | 384/535 X |
| 3,748,058 | 7/1973 | Bouiller et al. | 415/123 |
| 3,845,999 | 11/1974 | Zimmer et al. . | |
| 3,853,432 | 12/1974 | Cronstedt | 417/405 |
| 3,890,780 | 6/1975 | Hagemeister et al. | 60/39.08 |
| 3,897,985 | 8/1975 | Davis et al. . | |
| 3,910,651 | 10/1975 | Pearle et al. . | |
| 4,227,755 | 10/1980 | Lundberg | 384/518 |
| 4,440,456 | 3/1984 | Klusman | 384/581 |
| 4,555,190 | 11/1985 | Lederman | 384/495 |
| 4,557,664 | 12/1985 | Tuttle et al. | 415/105 |

Primary Examiner—Stuart S. Levy
Assistant Examiner—Thomas R. Hannon
Attorney, Agent, or Firm—Perman & Green

[57] ABSTRACT

A self-aligning bearing assembly for use with a frame and a shaft. The assembly comprises bearings such that the shaft can move relative to the frame and a spring and a friction surface for repositionably mounting the bearings relative to the frame. The spring and friction surface for repositionably mounting the bearings can frictionally hold the bearings in a first position relative to the frame and can allow the bearings to move to a second position relative to the frame and be frictionally held in the second position when repositioned thereto without affecting the critical speed of the shaft system.

17 Claims, 2 Drawing Sheets

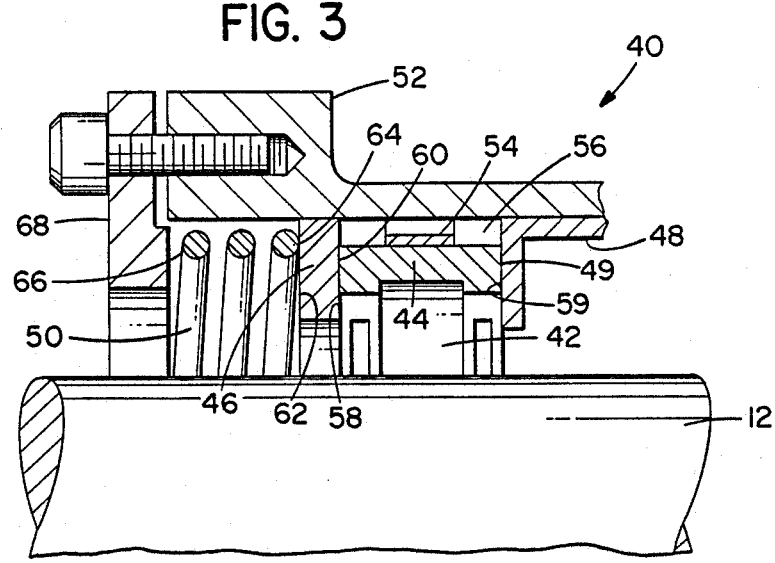

BEARING ASSEMBLY

BACKGROUND OF THE INVENTION

I. Field of the Invention

The present invention relates to bearing assemblies and, in particular, to a self-aligning bearing assembly.

II. Prior Art

Various types of bearings and bearing assemblies are generally known in the art. These bearings and bearing assemblies generally allow a first movable member such as a shaft to move relative to a second member such as a frame. In the area of gas turbine engines and, in particular, gas turbine engines having a forward fan, an engine generally comprises a main shaft having the turbine blades attached at a rear end thereof. The main shaft generally communicates from the rear end to a forward end of the engine having a gear box. A second shaft is provided which generally exits the gear box and communicates with the fan or a propeller of the engine. Appropriate reduction gears are provided in the gear box to reduce the number of rotations of the second shaft relative to the number of rotations of the first main shaft.

In the past, the first main shaft or power shaft was at least partially supported by a bearing or bearing assembly located proximate the gear box. However, due to such factors as manufacturing tolerances and thermal distortions, the first main shaft is often not properly aligned with the reduction gears in the gear box. This generally produces an improper load sharing affect on the gears and teeth of the gears in the gear box, thus reducing gear life and generating a cocking moment in the reduction gears which generally increases rapid gear wear.

Various bearings and bearing assemblies used in the gas turbine engine technology can be found in the following U.S. Patents: U.S. Pat. Nos. 2,659,637; 3,910,651; 3,897,985; 2,440,720; 3,845,999; 3,890,780; 3,853,432; 3,748,058; 4,557,664; 3,237,400. However, none of these references teach an acceptable solution to the problem of misalignment within a given clearance and within a maximum dynamic predetermined load on the bearing. Although the problem could be alleviated by removing the bearing or by reducing the spring rate of the bearing housing, the critical speed of the power turbine shaft is dependent on the position and rate of the bearing and its housing.

SUMMARY OF THE INVENTION

The foregoing problems are overcome and other advantages are provided by an improved bearing assembly. The bearing assembly is self-aligning to compensate for misalignment.

In accordance with one embodiment of the invention, a repositionable bearing assembly is provided for use with a frame and a shaft. The assembly has a bearing means with which the shaft can move relative to the frame. Means are provided having a spring means and a friction surface means for repositionably mounting the bearing means relative to the frame such that the mounting means can frictionally hold the bearing means in a first position relative to the frame, can allow the bearing means to move to a second position relative to the frame and can frictionally hold the bearing in the second position when repositioned thereto.

In accordance with an alternate embodiment of the invention, a self-aligning bearing assembly is provided for use with a frame and a movable member. The assembly has a bearing means connected to the frame and the movable member. Means are provided for automatically adjusting the position of the bearing means relative to the frame in response to a predetermined force. The adjusting means comprises means for frictionally holding the bearing means having a spring means and a friction surface means. The spring means forces at least a portion of the friction surface means to contact the bearing means and frictionally, but adjustably hold the bearing means whereby the bearing means can move relative to the frame in response to the predetermined force.

In accordance with one method of the invention, a method of manufacturing a self-aligning bearing is provided comprising the steps of positioning a bearing means between a frame and a shaft; positioning a friction means adjacent the bearing means; and holding the bearing means in a first position relative to the frame by means of a spring means compressably forcing the friction means to frictionally hold the bearing means whereby the friction hold can be overcome by a sufficient force to re-align the bearing.

BRIEF DESCRIPTION OF THE DRAWINGS

The foregoing aspects and other features of the invention are explained in the following description, taken in connection with the accompanying drawings wherein:

FIG. 3 is a partial cross-sectional view of a bearing assembly incorporating features of the invention.

DETAILED DESCRIPTION OF THE INVENTION

Figure 1:
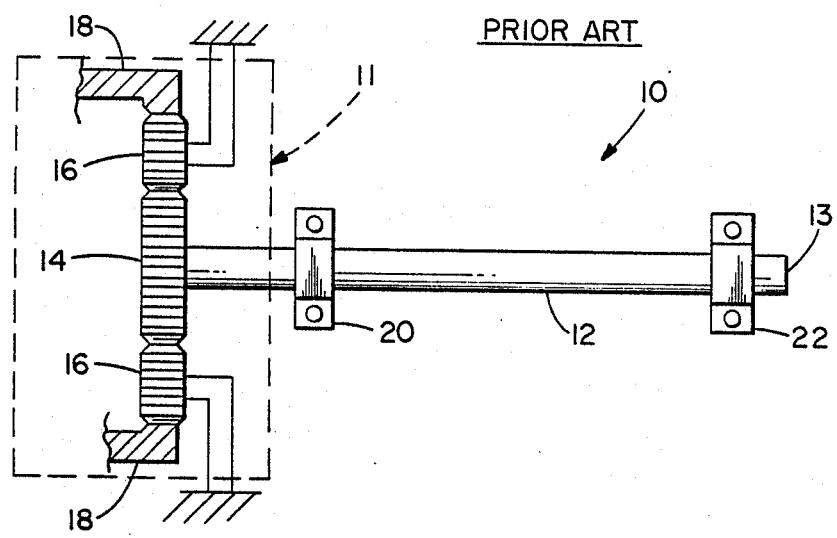
FIG. 1 is a diagrammatical view of a gas turbine engine main shaft and gear box assembly.

Referring now to FIG. 1, there is shown a diagrammatical view of a gas turbine engine main shaft and gear box assembly 10 as known in the art. As shown in FIG. 1, the assembly 10 generally comprises a main shaft 12 connected to a sun gear 14, planet gears 16, ring gear 18, a first bearing assembly 20 located proximate a gear box 11 and a second bearing assembly 22 located at a distal end 13 of the shaft 12. As shown in this diagram the main shaft 12 is relatively long. The second bearing 22 is fixedly connected to a frame of the engine such that the distal portion 13 of the main shaft 12 is relatively positionally fixed with the second bearing 22 except for rotational movement therein.

Figure 2:
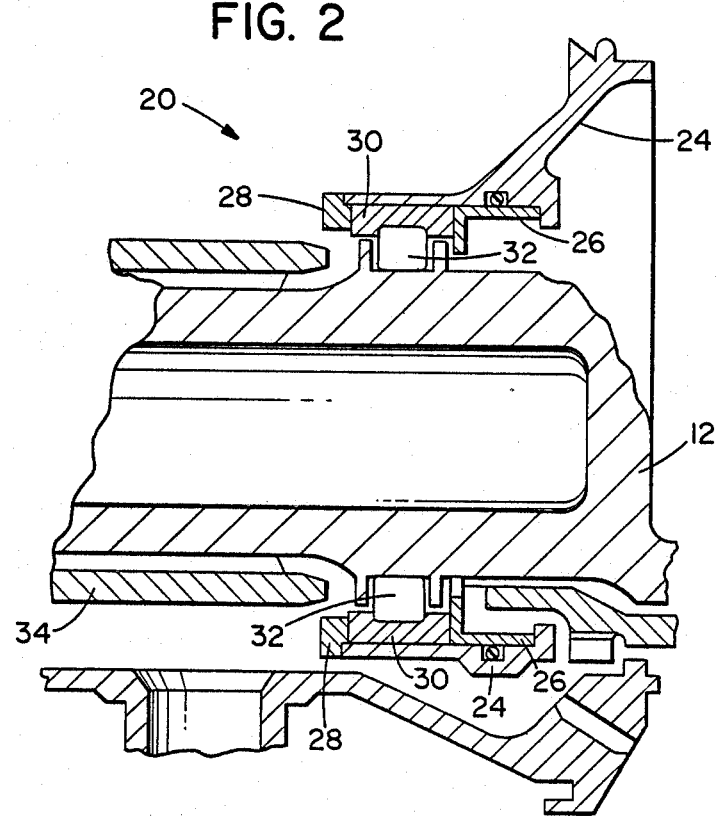
FIG. 2 is a cross-sectional view of a prior art bearing in use in a gas turbine engine.

Referring also to FIG. 2, a partial cross-sectional view of the first bearing assembly 20 of FIG. 1 is shown. The bearing assembly 20 is generally connected to the frame of the engine by a bearing housing 24. Connected to the bearing housing 24 is a housing seal 26 and a pinch plate cover 28. Fixedly mounted or held between the housing seal 26 and cover 28 is a bearing race ring 30 having bearing members 32 mounted between the shaft 12 and the race ring 30. The sun gear 14 generally has a spline 34 which is generally co-axially and fixedly aligned with and connected to the shaft 12.

Due to such factors as operational thermal distortions of the main power shaft 12 and manufacturing tolerances of the elements in the assembly 10, the power shaft 12 and sun gear 14 are often not aligned properly with the reduction planet gear 16. This produces improper load sharing on the planet gear 16 and sun gear 14 teeth, thus reducing gear life and possibly generating a cocking moment on the planet gears 16 further reducing the life of the gears. In the embodiment shown in FIG. 2, the bearing assembly 20 is generally held in a fixed position relative to the frame of the engine by the bearing housing 24. However, the bearing housing 24 is manufactured such that it can be deformed or flexed, which acts as a type of spring, to move the bearing 20 relative to the frame. The elastic deformation or stiffness of the bearing housing cannot be too high because it is needed to move the bearing 20 relative to the frame of the engine. With the movement of the bearing 20 relative to the frame, the end of the power shaft 20 and sun gear are allowed to slightly cock or tilt which reduces the cocking moment produced in the planet gears 16 and helps to realign the sun gear 14 with the planet gears 16.

Although the flexible bearing housing 24 acts as a means to re-align the sun gear 14 and planet gears 16, the relatively high stiffness of the housing 24 required to maintain the critical speed of the shaft above the operating speed produces high loads on the bearing and gear teeth when realignment is required. These loads could produce bearing and gear wear. Thus, this prior art device could not allow for the desired movement of the bearing 20 relative to the engine without also producing an undesired loading of the bearing 20 and the gear teeth. Therefore, the prior art devices have been unable to effectively correct for misalignment of the gears and prevent generating a cocking movement in the planet gears 16 and excessive loading of the first bearing 20 and subsequent bearing wear.

Referring now to FIG. 3, a partial cross-sectional view of a repositionable bearing assembly 40 incorporating features of the invention is shown which is intended for use as the first bearing assembly proximate the gear box. While the following description is being given with reference to the embodiment shown in the drawings, it should be understood that the present invention is intended for use in a wide variety of embodiments and methods of use. In addition, it should be understood that the elements of the present can include any suitable size, shape or material. In this embodiment, the bearing assembly 40 generally comprises a series of bearing members 42, such as roller bearings, a race ring 44, a thrust plate 46, a housing seal 48, a spring 50 and a bearing housing 52. The bearing members 42 are circumferentially located about a section of the shaft 12. The bearing members 42 are preferably made of a hard material such as a metal or metal alloy. However, any suitable material can be used. The race ring 44 generally surrounds the bearing members 42 such that the bearing members are kept in contact with the shaft 12. Located on a side of the race ring 44 opposite the bearing members 42, in this embodiment, is a wavy spring 54. The wavy spring 54, in the embodiment shown, is generally positioned in a gap 56 between the bearing housing 52 and the race ring 44. The wavy spring 54 is relatively weak in this embodiment and is used merely to initially centralize the bearing relative to the shaft 12 such that the bearing can be properly attached to the frame during assembly.

The race ring 44 is generally made of a suitable material such as through hardened steel. However, any suitable material can be used. The race ring 44 is also generally positioned between the housing seal 48 and the thrust plate 46. The housing seal 48 is relatively rigid and is generally fixedly connected to the bearing housing 52. A first side 59 of the race ring 44 generally contacts a first face 49 of the housing seal 48. The thrust plate 46 is located on the opposite side of the race ring and is generally ring shaped and sealing contacts the interior of the bearing housing 52. The thrust plate 46 is generally made out of a suitable material such as hardened steel. However, any suitable type of material can be used. The thrust plate 46 has a first face 58 which generally contacts a first side 60 of the race ring 44. The thrust plate 46 also has a second face 62 which is in general contact with a first end 64 of the spring 50. The spring 50, in this embodiment, is a coiled compression spring. However, any suitable type of spring can be used such as a bellville washer. The spring 50, in this embodiment, has its first end 64 in contact with the second face 62 of the thrust plate 46. A second end 66 of the spring 50 is in contact with a cover 68 fixedly connected to the bearing housing 52.

The bearing housing 52, in this embodiment, is generally fixedly connected to the engine frame. The bearing housing 52, as shown in this embodiment, is substantially similar to the bearing housing 24 of the prior art device shown in FIG. 2. Although the stiffness of the bearing housing 52 has not changed, with the present invention, as will be seen below, a stiffer bearing housing could be used although it is not necessarily required. However, in alternate embodiments, a substantially rigid and inflexible bearing housing may be provided with the present invention which can nonetheless allow for the re-alignment of the sun gear and further increase the margin between the operating speed and the shaft critical speed.

When the engine is first assembled, the wavy spring 54 allows for the centering of the bearing 40 relative to the shaft 12 at which point the bearing 40 can be fixedly attached to the frame of the engine. When the cover 58 is attached to the bearing housing the spring 50 is compressed between the cover and the thrust plate 46. The thrust plate 46 is relatively moveable in this embodiment and; therefore, the first face 58 of the thrust plate 46, being acted on by the spring, presses against the second side 60 of the race ring 44. The race ring 44, in turn, has its first face 59 pressed against the first face 49 of the housing seal 48. Since the housing seal 48 is fixedly attached to the bearing housing, the spring 50, in this embodiment, is slightly compressed and thereby compresses the elements of the assembly located between the cover and the housing seal 48. In a preferred embodiment, the installed load of the spring is about 1,000 pounds. The shaft 12 and bearing assembly 40 are held in a relatively constant position relative to each other by means of friction generated by the compression.

Due to the compressive load between the cover 58 and the housing seal 48, the race ring 44 is in compressive and frictional contact with the housing seal 48 and the thrust plate 46. Sufficient frictional forces are present between the first side 59 of the race ring and the first face 49 of the housing seal and the second side 60 of the race ring and the first face 58 of the thrust plate such that, absent a sufficient external force, the race ring 44 will remain in a relatively constant position and thereby maintain the shaft 12 and bearing assembly 40 in a relatively constant position to each other. In a preferred embodiment, the friction force is about 200 pounds which is in excess of the maximum unbalance force inherent in the shaft assembly.

During operation of the engine, as discussed above, certain factors such as engine dimensional tolerances and operational thermal distortions may cause misalignment of the sun gear 14 with the reduction planet gears 16. A misalignment of the sun gear 14 will automatically generate a self-centering force at the sun gear 14 which generates a force at the bearing assembly 40. When this force at the bearing assembly 40 exceeds the frictional forces holding the race ring 44 stationary relative to the bearing housing 52, the race ring 44, bearing members 42 and the shaft 12 will be allowed to move radially to the bearing housing 52 to a new second position. As the shaft 12, bearing members 42 and race ring 44 move from the first position to the second position, the sun gear 14 is allowed to cock or tilt such that the gears are relatively realigned and the cocking moment in the reduction planet gears 16 is prevented or at least reduced. When the shaft 12, bearing members 42 and race ring 44 move to the second position, the force at the bearing assembly 40 from the misalignment are reduced such that the misalignment force no longer exceeds the axial friction force of the bearing assembly 40 on the race ring 44 and; therefore, the bearing assembly 40 will once again regain its frictional hold on the race ring 44 and hold the shaft 12 and bearing housing 52 in a relatively constant position to each other.

The present invention obviously has many advantages over the devices described in the prior art. The present invention helps to reduce gear wear and provides a longer gear life. It also provides less wear on the bearing assembly from such factors as high loading and thereby provides a longer bearing life. The present invention allows for lower engine operating and assembly costs. It can also allow for higher shaft critical speeds which were heretofor limited by the prior art bearing assemblies. In addition, sun gear misalignment by use of the present invention can be limited to as small as about 0.0015 inch eccentricity at the bearing assembly 40 and can be automatically controlled for all conditions.

In an alternate embodiment of the invention, suitable means may be provided to supply oil, or other suitable material, to the gap 56 such that a constant co-efficient of friction is obtained and also to add lubrication and cooling to the assembly. In addition, other factors can be varied to adjust the assembly for any suitable use, such as changing the type or load of the spring 50, choosing certain textures or types of surfaces to adjust the co-efficient of friction or providing additional means to limit or adjust the amount or type of movement the race ring 44, bearing members 42 and the shaft 12.

It should be understood that the foregoing description is only illustrative of the invention. Various alternatives or modifications can be devised by those skilled in the art without departing from the spirit of the invention. Accordingly, the present invention is intended to embrace all such alternatives, modification and variances which fall within the scope of the appended claims.

What is claimed is:

1. An automatically repositionable bearing assembly for use with a frame and a shaft comprising:
   bearing means with which the shaft can move relative to the frame; and
   means for repositionably mounting said bearing means relative to the frame; said mounting means comprising a spring means and a friction surface means, said spring means urging said friction surface means to frictionally hold said bearing means in a first position relative to the frame, allowing said bearing means to move radially to a second position relative to the frame in response to a predetermined force and frictionally holding said bearing means in said second position when repositioned thereto.

2. An assembly as in claim 1 wherein said bearing means comprises a plurality of rollers.

3. An assembly as in claim 1 wherein said spring means is coaxially mounted relative to the shaft.

4. An assembly as in claim 1 wherein said friction surface means comprises a first surface in a relatively fixed position relative to said frame means.

5. An assembly as in claim 4 wherein said first surface is relatively perpendicular to the center axis of the shaft.

6. An assembly as in claim 4 wherein said friction surface means comprises a thrust plate having said bearing means, at least partially, positioned between said first surface and said thrust plate.

7. An assembly as in claim 6 wherein said spring means compresses said thrust plate against said bearing means such that said bearing means is frictionally and compressably held between said first surface and said thrust plate.

8. An assembly as in claim 7 wherein said spring means is compressed between said thrust plate and a cover means connected to the frame.

9. An assembly as in claim 7 further comprising a second spring means located between the frame and said bearing means.

10. An assembly as in claim 7 wherein said spring means supplies a force of about 1000 pounds.

11. An assembly as in claim 1 wherein the bearing assembly is for use with a shaft in a gas turbine engine.

12. A self-aligning bearing assembly for use with a frame and a movable member comprising:
   bearing means connected to the frame and the movable member; and
   means for automatically adjusting the position of said bearing means relative to the frame in response to a predetermined force, said adjusting means comprising means for frictionally holding said bearing means, said holding means having a spring means and a friction surface means, said spring means urging at least a portion of said friction surface means to contact said bearing means and frictionally, but adjustably hold said bearing means whereby said bearing means can radially move relative to the frame in response to the predetermined force from a first position to a second position and said holding means can hold said bearing means at said second position until adjusted again by said adjusting means and the predetermined force.

13. An assembly as in claim 12 wherein said adjusting means allows said movable member to self-align without affecting the critical speed of the movable member.

14. An assembly as in claim 12 wherein said adjusting means allows said movable member to self-align and allows the critical speed of the movable member to increase.

15. A method of manufacturing a self-aligning bearing comprising the steps of:
   positioning a bearing means having bearings and a race ring between a frame and a shaft;

positioning a friction means adjacent said bearing means; and holding said bearing means in a first position relative to the frame by means of as spring means compressably urging said friction means to frictionally hold said bearing means in the first position whereby the friction hold of said bearing means can be overcome by a pre-determined force to allow the bearing means to radially move and re-align the shaft and said friction means can frictionally hold the shaft at the re-aligned position until the pre-determined force overcomes the friction hold.

16. A method as in claim 15 wherein said friction means comprises a first surface member being relatively fixed to said frame means and a second surface member with said bearing means therebetween.

17. A method as in claim 16 wherein said spring means compressably forces said second surface member to frictionally hold said bearing means between said first and second surface members.

* * * * *